United States Patent [19]
Weiss

[11] Patent Number: 6,038,500
[45] Date of Patent: Mar. 14, 2000

[54] COMPUTER/BUS MESSAGE SYSTEM FOR VEHICLE DRIVE CONTROL SYSTEM

[75] Inventor: Heinz Weiss, Bensheim, Germany

[73] Assignee: Deere & Company, Moline, Ill.

[21] Appl. No.: 09/038,492

[22] Filed: Mar. 10, 1998

[30] Foreign Application Priority Data

Mar. 12, 1997 [DE] Germany ............ 197 10 082

[51] Int. Cl.⁷ ........................ B60K 1/02
[52] U.S. Cl. ............ 701/22; 180/6.5; 180/53.1; 180/65.8; 180/410; 701/33; 701/41; 701/43; 701/48
[58] Field of Search ............ 701/1, 22, 29, 701/33, 36, 41, 43, 50, 67, 69, 70, 93, 99, 102; 180/6.48, 6.5, 252, 53.1, 53.5, 65.1, 65.2, 65.3, 65.4, 65.8, 69.4, 400, 408–411; 307/9.1, 34; 60/711, 716; 318/140, 141, 142, 143; 475/5; 477/3; 74/661

[56] References Cited

U.S. PATENT DOCUMENTS

| | | | |
|---|---|---|---|
| 4,953,646 | 9/1990 | Kim ........................ | 180/65.4 |
| 5,301,769 | 4/1994 | Weiss ...................... | 180/249 |
| 5,418,437 | 5/1995 | Couture et al. ............ | 318/139 |
| 5,428,532 | 6/1995 | Yasuno ..................... | 701/48 |
| 5,575,737 | 11/1996 | Weiss ...................... | 477/43 |
| 5,813,488 | 9/1998 | Weiss ...................... | 180/65.6 |
| 5,947,855 | 9/1999 | Weiss ...................... | 475/5 |

FOREIGN PATENT DOCUMENTS 0 392 411   10/1990   European Pat. Off. .
40 39 005 A1   6/1991   Germany .

*Primary Examiner*—William A. Cuchlinski, Jr.
*Assistant Examiner*—Edward Pipala

[57] ABSTRACT

A drive system for utility vehicles, in particular for agricultural or industrial tractors, includes a generator driven by an internal combustion engine, a drive axle with wheels driven by associated electric motors which are powered by the generator, a steerable axle with wheels which are steerable together or individually by steering actuators, and manual operating control devices for vehicle operating functions such as steering and vehicle. The drive system includes a process computer which includes parallel and independently operating function modules for controlling high priority vehicle functions, such as steering, as well as function modules for low priority vehicle functions, such as speed input. The process computer transmits target value signals for actuator, such as electric wheel drive motors and steering actuators, in the form of a combined message communicated over a system bus. Information is exchanged between the function modules internally within the processor.

29 Claims, 5 Drawing Sheets

COMPUTER/BUS MESSAGE SYSTEM FOR VEHICLE DRIVE CONTROL SYSTEM

BACKGROUND OF THE INVENTION

The invention concerns a drive system for utility vehicles, in particular for agricultural or industrial tractors, with a generator driven by an internal combustion engine, with at least one drive axle, each of whose wheels is driven by an associated electric motor supplied by the generator, with at least one steering axle whose wheels are steered in common or individually by steering actuators, and with manual operating devices for at least the drive functions of steering and the speed input.

Utility vehicles and, in particular, agricultural tractors are driven at present by internal combustion engines and a multiplicity of gearbox types that differ in design and number of gear ratios. Drive systems are also known from U.S. Pat. No. 4,953,646, issued Sep. 4, 1990 to Kim, in which the internal combustion engine drives a generator which supplies current to two single wheel electric motors of a vehicle drive axle. In place of such a pure electric drive, U.S. Pat. No. 5,947,855, issued Jul. 9, 1999 and assigned to the assignee of this application, proposed a vehicle with a torque division electromechanical single wheel drive, in which the present invention can fundamentally be applied as well.

To supply the drive functions manual operating devices are applied that transmit the high priority steering wheel and brake pedal operations directly by mechanical and/or hydraulic means, that is, between the steering wheel and the steering arrangement as well as between the brake pedal and the brakes there exists a mechanical or hydro-mechanical connection. Up to the present time this has been required by law fundamentally for all utility vehicles for safety reasons. For agricultural tractors, which are permitted to operate only at speeds up to 40 Km/h, an exception permits the operation of the high priority steering arrangements and brakes by hydraulic servo systems. As a rule a number of low priority operating functions (for example, the speed input) are also preset directly. However, U.S. Pat. No. 5,575,737, issued Nov. 19, 1996 and assigned to the assignee of this application, also proposed the indirect input of lower priority operating functions electronically, in particular by means of a user interface.

By making additional functions available through which the maneuverability of the vehicle during operation or the steering capacity and safety during over-the-road operation are to be improved, the drive concept of the utility vehicle becomes ever more complex.

The goal of the invention is to reconsider the operation of all operating functions and to organize them uniformly anew as far as possible. Here it is desirable, in vehicles with a generator and electric single-wheel motors in which, for example, all four quadrants of the drive system are utilized for forward and reverse operation as well as for braking, to process together the functions of steering, driving and, if necessary also, of braking.

It also appears possible to shift the function of speed control to the electric single-wheel drives. Then the transmission as a mechanical unit as well as the axle functions with axle differential, differential lock etc. as well as the possible central differential with the central differential lock and even the braking function in retarder operation can be omitted or at least carry a reduced load. Thereby a multitude of costly components could be omitted and the operating functions could be arranged uniformly. The inclusion of further vehicle functions into the drive control is highly desirable. For the inclusion of high priority steering wheel and brake pedal actuation, however, high safety requirements must be met, which at present stand in the way of such an inclusion.

SUMMARY OF THE INVENTION

An object of the present invention is to provide a drive system of the aforementioned type that is based on a simple and efficient drive concept for the electric or electronic control of the vehicle.

A further object of the present invention is to provide a such a drive system which includes high priority operating devices into the control where at least equally high safety requirements can be met as underlie today's legal regulations.

A further object of the present invention is to provide a such a drive system which is simple and efficient and which is as safe as today's practice.

These and other objects are achieved by the present invention wherein drive strategies are automated by simple means so that the load on the operator can be reduced. The use of electronic components permits the cost of the improvement in the drive system to be held extremely low. The automation has an advantage since the operator has only a limited sensory capacity in regard to the road and weather conditions and therefore generally reacts more slowly than an electronic control is able to do. The invention also permits the vehicle reactions to appear predictable to the operator, that means that the utility vehicle does not unexpectedly change its behavior during operation. Furthermore, a unique relationship between the position of the steering wheel and the steering angle at the wheels can be assured. By including higher priority (higher importance) functions into the control the safety requirements can be met and may even be exceeded.

The invention permits the use of simple manual operating devices provided with sensors, that can be easily arranged in an ergonomically optimum position for the operator corresponding to the requirements in each case. The adjustment of the operating devices can be detected electronically by sensors. The signals from the sensors are processed in a process computer without distinction with respect to relative importance of the related operating devices, by parallel and independently operating function modules each associated with the individual operating device, for example, software function modules. The individual software function modules exchange their results so as to improve the real-time performance of the complete system internally within the computer, while the target value inputs to the associated controllers are transmitted as communications over a system bus.

The mutual exchange of information between the individual software function modules is therefore not carried over the system bus, but is performed internally within the process computer. This avoids time delays in a heavily loaded system. The information exchange can be performed more rapidly and with fewer conflicts. This significantly increases the safety of the system. The rapid information exchange and the lack of conflicts in the system makes it possible for the signals which have a higher relative importance to be processed and evaluated in the process computer without any risk to the safety. It is therefore no longer necessary to process the higher importance signals preferentially before the lower importance signals.

The definition of so-called higher importance signals and the preferential processing of these signals in contrast to so-called lower importance signals is no longer necessary with the use of the solution according to the invention. Thereby, the previous practice of directly linking mechanically or hydraulically an operating device (for example, the steering wheel) with the associated controller (for example, steering actuator or steering linkage) to meet high safety standards is no longer required.

Communications are transmitted with a regular cycle frequency over the system bus which contain information items that had been processed by the particular function module up to the instant of transmission of a communication. The information items of a function module not yet completely processed up to this instant are held ready for a later communication.

The communications are circulated to the controllers of all associated controllers, such as electric motors, steering actuators, brakes and the like, in order to control these. Each controller connected to the system bus basically receives all communications and detects which parts of the communication are intended for it and evaluates these. In case of a failure of signals the controller continues to operate with the information received previously.

A potentially considerable saving can accrue from a preferred embodiment of the invention in which the higher importance functions, steering and braking, are utilized in the drive system alongside the lower importance inputs, for example, the speed input, in that each of these functions is associated with at least its own parallel and independently operating function modules. On the one hand, the function modules determine target value inputs that are transmitted as communications over the system bus to the controllers (electric motor controller, steering controller and brake controller) for the associated controllers. On the other hand, they exchange information among each other internally within the processor (processor-internal data exchange).

With increasing steering angles the front and rear wheels run along increasingly different radii. This requires an equalization of rotational speed, since, if torque equalization is restricted, high circumferential loads on the wheels are the result, which can over-stress the drive-line. This problem is explained in greater detail, for example, in U.S. Pat. No. 5,301,769, issued Apr. 22, 1994 and assigned to the assignee of this application. Preferably, the steering module therefore contains a steering performance map memory. The steering module determines from the signals of a steering operating device the momentary relative steering angles [Ackermann angles] and establishes correction data (for example, rotational speed corrections) in conjunction with the steering performance map memory for each wheel with the goal of making possible at all steering angles a uniform stress-free drive and braking of the wheels. The correction data determined by the steering module are transmitted internally within the processor to at least one further function module, preferably to a gearbox module or a brake module. The further function module performs corresponding corrections on the target value inputs processed by it and transmits the corrected target value inputs in communications over the system bus to the single-wheel drive controllers.

The steering angle control signals are provided as input preferentially by the steering operating device, for example, a steering wheel, steering lever or joy-stick. In one embodiment of the invention the steering angle control signals can also be directly prepared by automatic steering guidance systems or they may be retrieved indirectly from steering sequences in a sequence memory. Here the sequences may have been stored in memory during a preceding operation or they may also have been stored, for example, from a contour-line model of the terrain to be operated planned in advance by the operator at a terminal. The operating modes of the steering guidance systems and steering sequences can be activated by inputs of the operator at the terminal, which may be connected over its own independently operating function module with the process computer, and may be reactivated after an automatic disconnection due to an intervention into the steering process by the operator. For safety reasons the direct steering angle inputs from the operator always has priority over steering guidance systems or steering sequences.

The actual vehicle speed can be made available on the system bus along with other sensed data from the vehicle, and is significant since the steering should appropriately be variable for the sake of safety and driving comfort under various operating conditions, with respect to the steering drive ratio, the damping, response characteristic etc. for example, front loader operation or over-the-road operation. Furthermore, the steering is influenced by the vehicle geometry (track width, wheelbase, kingpin inclination, steering geometry, steering errors, tires etc.), the type of steering selected (two-wheel steering, four-wheel steering, synchronized steering) and the like. The consideration of a multitude of such operating applications and other influences could be enhanced by a presentation on a virtual terminal which can be applied most effectively by means of today's electronics.

There is a particular advantage in the target value inputs that are available for the steering from the steering angle control signals preset by the steering wheel, which are dependent upon the current vehicle speed. This can be accomplished by classifying the steering angle inputs with respect to the actual vehicle speed according to predetermined limits, in order to determine from values stored in the performance map memory steering angle target value inputs for a steerable front axle and/or a steerable rear axle in terms of amount and direction (left/right). The classification parameters may be stored in a performance map memory of the steering module. If, for example, the vehicle speed exceeds a predetermined value, then the steering angle control signal receives a steering angle target value input by means of which the steering actuator programs a somewhat smaller steering angle than it would have done at lower speeds. The steering angle target value inputs thus determined are transmitted over the system bus and received and recognized by the steering controllers. The same steering angle target value input information items may appropriately also be made available internally within the processor directly to other function modules, in particular the gearbox module and/or the brake module, so that these may consider the steering angle target value inputs during their signal processing.

Preferably, a low priority speed input is included into the drive system according to the invention in which the electric signals of a gearbox control that can be actuated by an operator are processed by an independently operating gearbox module. The gearbox control may, for example, be a single lever by means of which the operator establishes a desired vehicle speed. The gearbox module calculates rotational speed values for the various electric motors and delivers these encoded in communications containing target value inputs over the system bus to the single-wheel drive controllers, in particular the electric motor controllers. Furthermore, the gearbox module transmits internally within the processor correcting data to at least one further independently operating function module. It is advantageous, for example, if a gearbox module transmits the next calculated target speed values internally within the processor to a steering module and an internal combustion engine module. Thereby the calculation results of a gearbox module are used not only for the control of the electric motor controllers. Rather its results are made available internally within the processor also for the correction of the results of a steering module and/or an internal combustion engine module and, if available, further function modules.

Most appropriately the gearbox module contains a speed performance map memory that can be programmed from a terminal on the basis of which the rotational speed values of the individual electric motors can be modified in order, for example, to limit the vehicle speed and/or to apply different vehicle strategies (for example, selection of speed maps for special applications). The gearbox module primarily makes available control data for the single-wheel drives, in particular the electric motors. Conventional gearbox devices are not necessary components of the drive system according to the invention. Nevertheless, the invention can be applied to drive systems that contain gearbox components such as clutches, brakes or shift-controlled gearboxes. In this case the communications carried over the system bus may also contain information items of the gearbox module that are intended for the gearbox devices.

Preferably, an independently operating gearbox module is provided, that determines speed target values from the speed desired by the operator and the actual vehicle speed. These speed target values are preferably corrected for each driven wheel depending upon the actual steering angle, in order to make possible a stress-free rolling of all wheels. Here, for example, the map values determined by the steering module from the relative steering angle relationship for each wheel are multiplied by a desired speed target value in order to obtain speed target value inputs for the drives of the wheels. Preferably, the gearbox module contains an algorithm by means of which the speed target value input is modified by a time dependent factor, so that sudden larger changes in the target value inputs are avoided and the drive components are not overloaded.

Preferably, a maximum vehicle speed that the vehicle should not exceed can be preset with a speed control lever. The gearbox module determines from the desired speed rotational speed target values for the wheel drives. When the vehicle reaches the preset maximum speed, the gearbox module reduces these target values in such a way that the preset maximum speed is not exceeded.

The controllers of the wheel drives select the torques developed by the wheel drives corresponding to the target value inputs of the gearbox module. Wheel rotational speed then result from the conditions at the wheel. These can then be fed back to great advantage over the wheel drive controllers and the system bus to the process computer. The gearbox module reviews to see whether the rotational speed attained correspond to the ideal condition, which can be calculated from the knowledge of the vehicle geometry and the actual steering angle with the use of the relative steering angle conditions. If it is determined that the rotational speed of one or more of the wheels does not correspond to this ideal condition, the rotational speed target values of the corresponding drives are corrected through the gearbox module.

A sensor to determine the vehicle speed can support the control of the wheel rotational speeds but is not absolutely necessary.

Preferably, each electric motor is associated with an electric motor controller that controls the target rotational speeds transmitted over the system bus under consideration of the load and power flow conditions experienced at the wheel by raising or lowering the wheel torques. This makes it possible to consider wheel slip and an increased load on a wheel (such as when encountering an obstacle), that can be recognized and transmitted as corrections to the associated electric motor controller which thereupon adjusts the power. The same is performed upon a reduction in the load of a wheel due to poor adhesion (icing conditions) and the like.

Preferably, the process computer contains an independently operating internal combustion engine software function module. This transmits over the system bus target value inputs for an internal combustion engine controller which controls the fuel injection quantity for the internal combustion engine. The internal combustion engine module calculates the target value inputs on the basis of the target rotational speeds or the target speeds of the wheels, which have been preset by the operator and/or made available internally within the processor.

Initially, the design point for the drive system uses the rated power output of the internal combustion engine. In case the operating conditions do not require the full rated power of the internal combustion engine, the internal combustion engine module determines to great advantage the power output required by the generator at lower rotational speed and higher torque of the internal combustion engine with thereby increased efficiency. For this purpose the internal combustion engine module refers to performance maps for the internal combustion engine and/or the generator which had been stored in its memory. The fuel injection quantity target value input is optimized in the internal combustion engine module from the target speed, the power requirement of the vehicle and the performance maps in such a way that the overall efficiency of the drive system is favorable. Processes for the control of a drive-line with the goal of a favorable efficiency, low fuel consumption and an optimum emission performance are described, for example, in published European patent Application 0 698 518. Electric motors are able to directly reproduce the drawbar load hyperbolas of agricultural tractors and to directly control the mechanical magnitudes of torque and rotational speed with the electrical magnitudes of current and voltage or alternately use frequency conversion. The rotational speeds and torques can be determined without sensors from the currents and voltages.

This drive system can also be applied to great advantage to electromechanical drives with torque division, as was described in the aforementioned U.S. patent application Ser. No. 08/870,846, which is incorporated by reference herein. Since here the power flows can be manipulated up to the return flow of electrical power, wide latitude is available for the utilization of the possibilities described for the optimization of the overall efficiency. This optimization is the responsibility of the internal combustion engine module which thereby establishes the basic control points of the internal combustion engine and the generator and encodes them into communications that are transmitted over the system bus.

As long as mechanical power take-off shafts are applied, it is appropriate to preset the rotational speed of the internal combustion engine with a manual throttle or the like. Here the internal combustion engine module considers the manual throttle position and the question whether the power take-off shaft mode is engaged or disengaged, which can be accomplished, for example, through a terminal. The internal combustion engine module transmits over the system bus to the internal combustion engine controller corresponding target value inputs to set a constant internal combustion engine rotational speed.

In order to keep the operating devices of future utility vehicles and tractors comparable to current practice, a preferred embodiment of the invention proposes that a clutch pedal not be omitted, not even in the case that the control of shift functions for gear ratios and groups can be omitted and the clutch is used only to interrupt the mechanical power flow, in order, for example, to freely control the power take-off shaft. A clutch increases the safety of operation during panic maneuvers (if, for example, the operator operates the control devices rapidly, uncontrolled and not coordinated with each other), has advantages during starting of the internal combustion engine and permits towing of the vehicle.

A clutch is particularly appropriate on vehicles with electromechanical drives, in which the internal combustion engine drives at least one drive shaft directly or through a gearbox that is connected to the drive axle and in which each wheel of the drive axle is associated with a pick-off gearbox which combines the output power of the drive shaft and the associated electric motor and delivers it to the wheel. Such drives are described in greater detail in the aforementioned U.S. Pat. No. 5,947,855.

Depending on the stroke of operation of a clutch control or a clutch pedal, a clutch module can generate varying target value inputs. It is advantageous if the clutch module does not yet generate any information for disengaging the clutch in a first actuating phase of the clutch pedal, if this, for example, is depressed only partially, but orders a gearbox module to generate stored speed signals corresponding to a coasting vehicle, and to transmit these over the system bus to the drive control.

Preferably, the clutch module transmits information over the system bus to the clutch controller, only in a second actuating phase of the clutch pedal, such as when it is fully depressed, in order to disengage the clutch and to interrupt the power flow of the mechanical drive-line. If necessary, the clutch module can transmit information items simultaneously internally within the processor to the gearbox controller so as to order it to synchronize the clutch, that is, to coordinate the rotational speeds to both sides of the clutch with each other so that the clutch can again be engaged at any time without overloading the clutch.

During front loader operations high gearbox torques occur during acceleration and braking of large masses. Since the braking capacity of the internal combustion engine in particular is not adequate to absorb these torques, a turning clutch is provided for turning maneuvers of this type, which can support the high torques on the vehicle chassis. In the usual manner the turning clutch may include two clutches or one clutch and one brake, by means of which gearbox shafts or gears can be connected to each other or supported on the gearbox housing.

To perform a reverse maneuver a number of operating sequences are necessary. Preferably, these are stored in the process computer and are evaluated by a reverse module depending on whether the reverse control is in forward, neutral or reverse position. The reverse module transmits internally within the processor corresponding signals to other function modules and makes available over the system bus corresponding information items to the controller.

When the forward, neutral and reverse lever is operated (reverse control), orders are transmitted internally within the processor from a reverse module to a gearbox module as well as a clutch module, to reduce the speed from the actual direction of operation according to a preset scheme and to disengage the clutch or a reverse clutch at a defined speed. Thereupon, the reverse module initiates the reversing process. After the completion of the reversing process the reverse module orders internally within the processor the clutch module and the gearbox module to engage the clutch or the reverse clutch and to increase the speed according to a preset scheme in order to accelerate the vehicle again in the opposite direction.

In a further preferred embodiment of the invention, a brake control is provided that can be operated by the operator, for example, a brake pedal, which delivers electric brake control signals corresponding to its operating position, to an independently operating brake module contained in the process computer. The brake module transmits over the system bus target value inputs in the form of communications to at least one brake controller, in order to control at least one brake actuator, for example, a hydraulic brake valve, depending on the brake signal, when a preset brake signal is exceeded.

Furthermore, a preset degree of deceleration (retarder) can be evaluated and transmitted to a gearbox module internally, which determines or corrects rotational speed values for the individual electric motors, and delivers these as target value inputs over the system bus to electric motor controllers that are associated with the electric motors.

Preferably, the brake module gives an order to the gearbox module when the brake pedal is actuated in a first operating phase (retarding), in order to reduce the speed to correspond with the inputs from the operator (for example, brake pedal position) at which time the brakes are not yet applied. When the brake pedal is actuated in a second actuation phase (exceeding a preset brake signal) the brake module transmits over the system bus information items in the form of communications to all brake controllers and, if necessary, the clutch controller, in order to actuate the brakes according to the input from the operator and, if necessary, to disengage a clutch in the mechanical part of the drive-line, so that the main brakes at the wheels do not operate against the internal combustion engine.

In a further preferred embodiment of the invention, the brake module takes over the leading role from the gearbox module when a preset brake signal is exceeded and calculates from the desired speeds supplied as input by the operator by means of the brake pedal as well as from actual speeds fed back by the vehicle a new target speed, on the basis of which rotational speed factors for all single wheels are determined from performance maps, if necessary together with the target value inputs reported by the steering module for front and/or rear axle steering. The wheel rotational speeds calculated by the brake module are transmitted in terms of amount and direction to the brake controllers of the individual single wheel brakes in the form of communications.

It is also advantageous that when a preset brake signal is exceeded, the brake controllers take over the leading role from a gearbox controller, and control the preset wheel rotational speeds, which correspond to the degree of actuation of the brakes and, if necessary, are corrected by the steering angles, depending on the slip conditions and the load on the wheels, so that the required speeds are attained.

In the mechanical part of the drive-line at least one clutch is preferably provided by means of which the internal combustion engine can be uncoupled from the drive-line. When a preset brake signal is exceeded the brake module transmits internally within the processor on the one hand information items to a clutch module to disengage the clutch and on the other hand it causes a gearbox module to transmit information items in the form of communications to the electric motor controllers, in order to control these in such a way that the clutch is carried along synchronously and can be engaged again at any time.

When the brake is deactivated it is advantageous to store the vehicle speed attained as the new desired speed in the gearbox module, in order to be able to continue operation with this speed after braking.

So that the operator can transmit data, map values, algorithms, tables of values and control orders to the drive system, and can thereby extract the data and information, a corresponding terminal is appropriately connected to the process computer. This contains, for example, a monitor with screen and an input keyboard.

This terminal can also be used, for example, to input operating sequences for the utility vehicle and, if necessary, for implements attached to the utility vehicle, which are stored in a sequence memory in the process computer. When a sequence mode is activated corresponding information items are transmitted internally within the processor to the function modules affected, in order to follow the operating sequences. This is particularly advantageous in connection with precision farming.

Preferably, an efficiently operating system bus is used for orderly and reliable communication between the user interface and the independently operating controllers or component controllers. Furthermore, a redundant design is proposed for the system bus for utility vehicles, in particular for agricultural tractors, in order to attain an additional safety factor for the high priority controls of steering and braking. The two bus cables should be laid out so that they are separated by a space from one another, so that in case of mechanical damage to one cable the other cable is available as a backup. The cable for the additional bus should also carry current and be connected to a supplementary battery of the process computer.

The function modules contained in the process computer are not limited to pure vehicle functions. Rather it may be of particular advantage to provide function modules that control implements that are attached to the utility vehicle or that operate together with the latter. This configuration may be particularly useful for agricultural machines, in which implements should be controlled depending upon the operating conditions and the position of the utility vehicle.

DETAILED DESCRIPTION

Figure 1A:
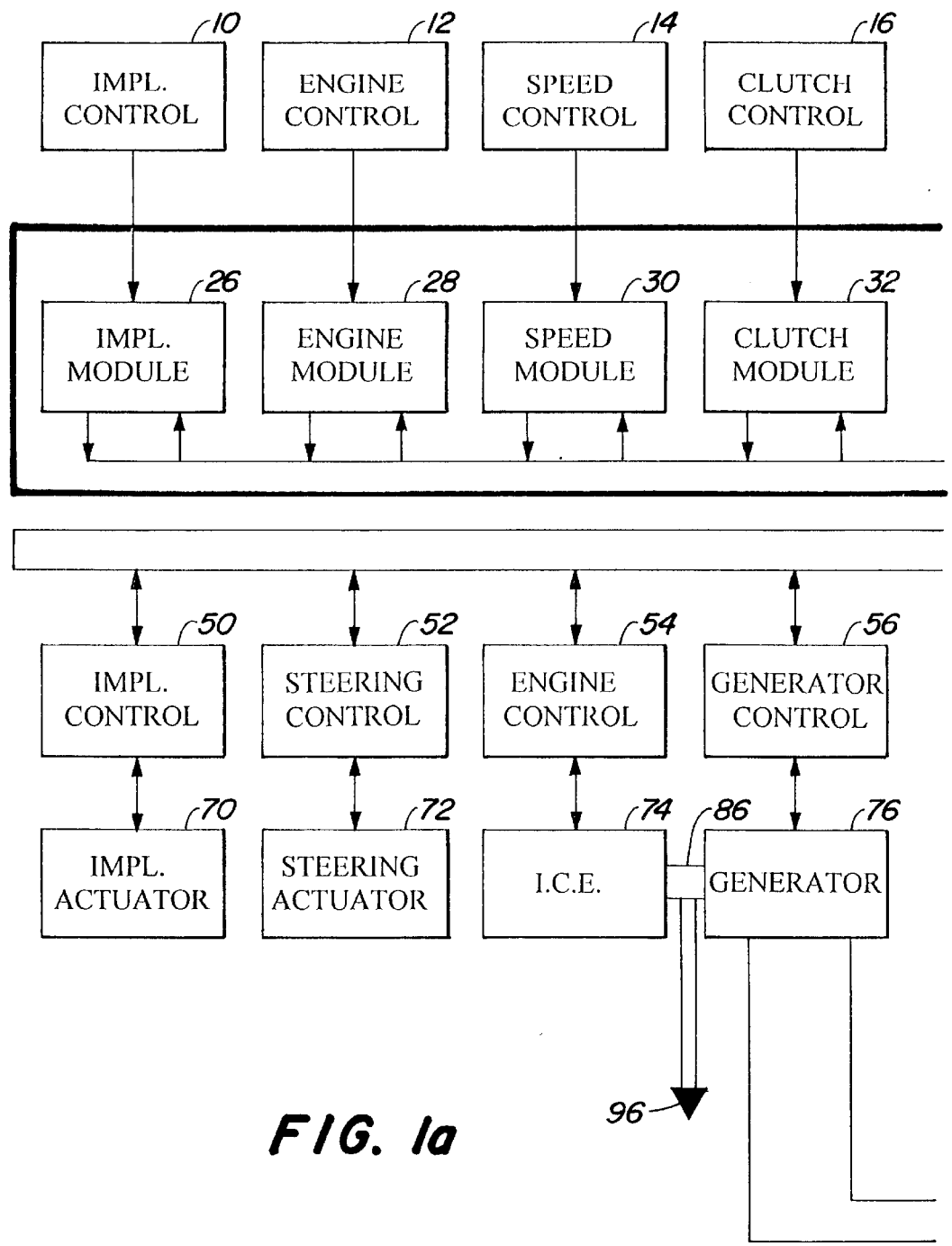
FIGS. 1a and 1b form a schematic block diagram of a drive system, for an electrically driven vehicle, according to the present invention.
Figure 1B:
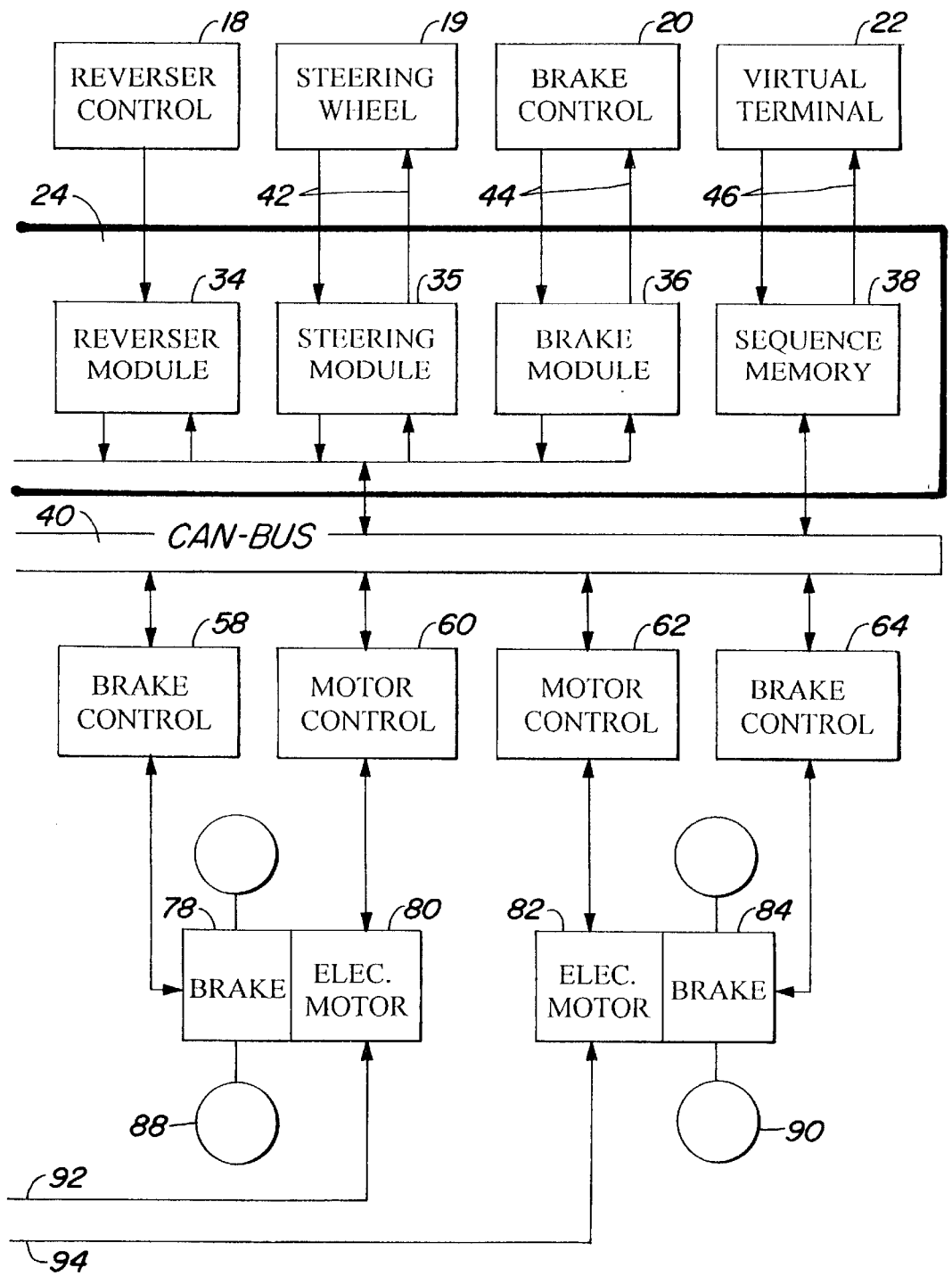

Referring to FIG. 1, the drive system includes a plurality of vehicle control devices, including an implement control 10 for the input of control signals for an implement (not shown) connected to the vehicle, an engine control 12 that may be configured as a manual throttle or a gas pedal or a combination thereof, a speed control lever configured as a gearbox control 14, a clutch control 16 that may be a foot-operated clutch pedal, a reverse control 18 that may be configured as a shift lever for forward and reverse operation, a steering wheel 19 as a steering control device, a brake control 20, for example, in the form of one or more brake pedals, The drive system also includes a virtual terminal 22, which permits the output and input of various data, map values, algorithms, tables of values, signals and information items. The terminal 22 may contain a monitor (not shown) and an input keyboard (not shown) over which status reports, error signals, diagnostics, etc. can be displayed as required for all system functions and that makes possible the input of any desired system parameters and system conditions and in the case of error functions also permits the input of substitute functions.

The control devices 10–20 and the terminal 22, together with the process computer 24, form a use interface. The process computer 24 contains a number of substantially independently and parallel operating software function modules, including an implement function module 26, internal combustion engine function module 28, gearbox function module 30, clutch function module 32, reverse function module 34, steering function module 35, brake function module 36 and operating programs for the virtual terminal 22. The process computer 24 also includes a memory 38 in which are stored data relating to operating sequences.

The operating devices 10–20 are preferably equipped with electric switches or position sensors (not shown) which sense the actual current position of the operating devices 10–20 and generate electric position signals which are transmitted as inputs to the associated function modules 26–36. These inputs are processed simultaneously and in parallel by the function modules 26–36. Each function module 26–36 is autonomous and operates independently of the other function modules 26–36. Each function module 26–36 includes routines, parameters and performance maps necessary for its function, but may also cooperate with routines, parameters and performance maps stored in the process computer 24. The results of the processing or calculation of the individual function modules 26–36 are incorporated into a combined message by the process computer 24 and transmitted over a system bus 40, preferably a redundant computer area network "CAN" bus. This message contains target value inputs for the various controllers.

In the preferred embodiment, the function modules 26–36 are separate and different computer program subroutines which are executed by process computer 24, and information is exchanged between the subroutines internally within the computer 24, without information having to be transmitted over the system bus 40. Hence, it is possible that calculation or processing results of one function module 26–36 are used by another function module 26–36 directly for their own signal processing.

Similar to the way an operator's attention today is drawn to the actuation of an ABS (anti-lock braking system) by the vibration of the brake pedal when the ABS is activated, the operating devices for the steering 19 and the brake 20 connected to the process computer 24 can similarly be used to provide feedback to the operator about the condition of the vehicle. Furthermore, information from the system can be fed back to the operator on the terminal 22, as indicated by the bidirectional arrows shown in the Figures.

The combining of substantially independent function modules 26–36 in a process computer 24 improves safety of the system and improves the response time, particularly in panic maneuvers, when steering, clutch, brakes etc. are actuated simultaneously. Carrying information between the function modules over the system bus 40 would lead to unacceptable time delays. By the direct communication of the function modules 26–36 within the process computer 24 as well as internal references within the process computer 24 to stored parameters, routines and maps the system bus 40 is relieved of load, which permits a more rapid transmittal of the target value inputs.

The operating devices 10–20 may be capable of performing multiple functions. For example, a reduction in the speed by means of the gearbox lever 14 can be performed by actuation of the brakes 20. Substitute functions may be powered up and automatically indicated to the operator by the terminal 22 in case of failure of one of the operating devices, such as described in PCT patent publication WO 94/06651, wherein the functions are described in relation to an engine with a following hydrostatic-mechanical torque division gearbox, which drives the axles.

A further improvement in the safety of the functions steering, braking, clutch etc. can be attained by equipping the process computer 24 with a supplementary battery in the case of failure of the vehicle battery. The safety of the system bus can be increased by redundancy, by the use of two bus cables (not shown) separated by a space.

The system bus 40 is connected to a plurality of controllers for various vehicle subsystems. FIG. 1 shows an implement controller 50, a steering controller 52, an engine controller 54, a generator controller 56, a left brake controller 58, a left electric motor controller 60, a right electric motor controller 62 and a right brake controller 64. The vehicle subsystems include an implement actuator 70, a steering mechanism 72, an internal combustion engine 74, a generator 76, a left brake 78, a left electric motor 80, a right electric motor 82 and a right brake 84.

The implement controller 50 controls the implement actuator 70 of an implement (not shown) attached to the utility vehicle. The actuator 70 may be connected to the utility vehicle by electric lines and a plug-in connection box (not shown). An implement control device 10 provides implement control signals to the implement function module 26.

The steering controller 52 controls a steering actuator 72, such as a hydraulic control valve connected to a steering cylinder (not shown). Only one steering controller 52 and one steering actuator 72 are shown, but the steering function module 35 can deliver control signals for several steering controllers 52 and steering actuators 72, for example, for individual steerable wheels or for a steerable front axle as well as a steerable rear axle.

The engine controller 54 controls the injection pump (not shown) of the internal combustion engine, in particular diesel engine 74, and the generator controller 56 provides control signals for the generator 76, which is driven by the engine 74 through an output shaft 86.

A left front wheel 88 and a right front wheel 90 of a drive axle, each have a corresponding brake 78, 84 and a corresponding electric motor 80, 82. The brakes 78, 84 are controlled by the brake controllers 58, 64 while the electric motors 80, 82 receive their control signals from the electric motor controllers 60, 62. Electric cables 92, 94 transmit electric power from the generator to the electric motors.

As indicated by the double arrows, the system bus 40 is connected to the individual controllers 50–64 as well as the controllers 50–64 to the associated actuators 70–84, and data and information is exchanged in both directions. Thus, on the one hand target value inputs are transmitted over the system bus 40 to the individual controllers 50–64 and from these control signals are transmitted to the associated actuators 70–84. On the other hand, information can be fed back regarding the status of the actuators 70–84 to the controllers 50–64 and information from the controllers 50–64 can be transmitted over the system bus 40 to the process computer 24 and the functions modules 26–36.

Referring now to FIG. 1, the steering function module 35 receives control signals from the steering wheel 19 and determines from these target value inputs for the steering controller 52, which controls the steering mechanism 72. Signal feedback is also possible from the steering mechanism 72 over the bus 40 to the steering controller 52, the steering function module 35 and to the steering wheel 19, in order to feed back to the operator relating to steering obstacles.

The target value inputs determined by the steering function module 35 can be subjected to corrections in consideration of the actual vehicle speed in which reference is made to a stored performance map memory, which contains data for the classification of steering signals according to specific limits in the actual vehicle speed. The detection of the actual vehicle speed and transmittal on the system bus 40 can be performed in the usual manner and is not described here in any further detail.

Furthermore, the steering function module 35 can be controlled through the virtual terminal 22, in order to extract steering inputs from a steering guidance system or in order to execute steering sequences that can be provided as input or stored in the process computer 24. In addition, the steering function module 35 can calculate correcting data for the rotational speeds of the individual wheels 88, 90 while considering the relative steering angle factors and transmit these internally within the computer 24 to the gearbox function module 30.

The engine function module 28 evaluates the electric control signals of the engine control device 12 and issues target value inputs for the engine controller 54, which controls the fuel injection pump (not shown) of the engine 74. The engine control 12 can be used, for example, to preset constant power take-off shaft rotational speeds for a power take-off shaft 96 attached to the output shaft 86 of the engine 74. However, it is also possible to cause the engine function module 28 to refer to engine performance maps stored in the process computer 24, with the goal of controlling engine 74 so as to operate at the highest possible efficiency. Also, target speed values are supplied by the gearbox function module 30 internally within the computer 24 and the power demand is fed back by the engine 74.

The gearbox function module 30 processes control signals from the gearbox control device 14. It receives and processes correction data supplied by the steering function module 35 internally within the computer 24, which data depends on the steering angle, and transmits over the system bus 40 rotational speed target value inputs for each electric motor controller 60, 62, so that the latter control the associated electric motors 80, 82 and wheels 88, 90 with the appropriate speed. The gearbox function module 30 can also receive control signals from a control device (not shown) for the control of maximum vehicle speed and on that basis limit the rotational speed inputs, and thereby speed of the vehicle speed. The load and power flow relations of the electric motors 80, 82 can be fed back to the electric motor controllers 60, 62 in order to control the target value inputs transmitted over the system bus 40 by raising or lowering the output of the electric motors. Furthermore, wheel load feed back signals can be transmitted over the system bus 40 to the gearbox function module 30, which can generate corresponding corrections to the target values.

The clutch controller 32 receives control signals from the clutch control device 16 and generates control signals which are transmitted internally within the computer 24 to the gearbox function module 30, in order to cause it to deliver target value inputs to the electric motor controllers 60, 62, which correspond to those of a coasting vehicle. When the clutch control 16 is actuated the vehicle thereupon behaves as if a drive clutch in a mechanical drive-line had been disengaged. Programs for a coasting vehicle can be stored in the process computer 24.

The reverse control 18 can generate control signals for a reverse function module 34. Depending on the position of the reverse control 18 in forward, neutral or reverse position, the reverse function module 34 transmits signals internally within the computer 24 to the gearbox function module 30 in order to cause it to deliver target value inputs to the electric motor controllers 60, 62 corresponding to the desired direction of operation.

The brake function module 36 receives control signals from the brake control device 20 and generates target value inputs for the brakes 78, 84 which are communicated over the bus 40 to the brake controllers 58, 64. If the brake control device 20 is only partially actuated (first actuation phase), then the brake function module 36 generates a retard signal which is transmitted internally within the computer 24 to the gearbox function module 30, in order to cause this to retract the target value input to the electric motor controllers 60, 62 depending on the actuation stroke of the brake control 20. At this point, the brakes 78, 84 are not yet actuated. If the stroke of the brake control device 20 exceeds a preset value (second actuation phase), then the brake function module 36 transmits target value inputs over the system bus 40 to the brake controllers 58, 64 so as to actuate the brakes corresponding to the position of the brake control. Simultaneously, the brake function module 36 takes over control from the gearbox function module 30 with respect to controlling speed. The brake function module 36 determines target speeds from the desired speed (or deceleration) given as input through the brake control device 20 as well as from the actual speed of the vehicle fed back over the system bus 40, which may be adjusted, if necessary, by correction values depending on the steering angle in the steering function module 35. Target value inputs for the brake controllers 58, 64 are then derived from the target speeds. As long as a clutch 102 is included in the mechanical drive-line (see FIG. 2) the brake function module 36 delivers a signal to disengage the clutch 102 when the aforementioned brake value is exceeded.

In order to store and recall operating sequences the process computer 24 contains at least one sequence memory 38. The contents of the sequence memory 38 can be adjusted to meet the requirements by means of the virtual terminal 22. The sequence memory 38 can also make available internally within the computer 24r information for the other function modules. Furthermore, it can generate messages that are communicated over the system bus in order to perform corresponding functions.

Figure 2A:
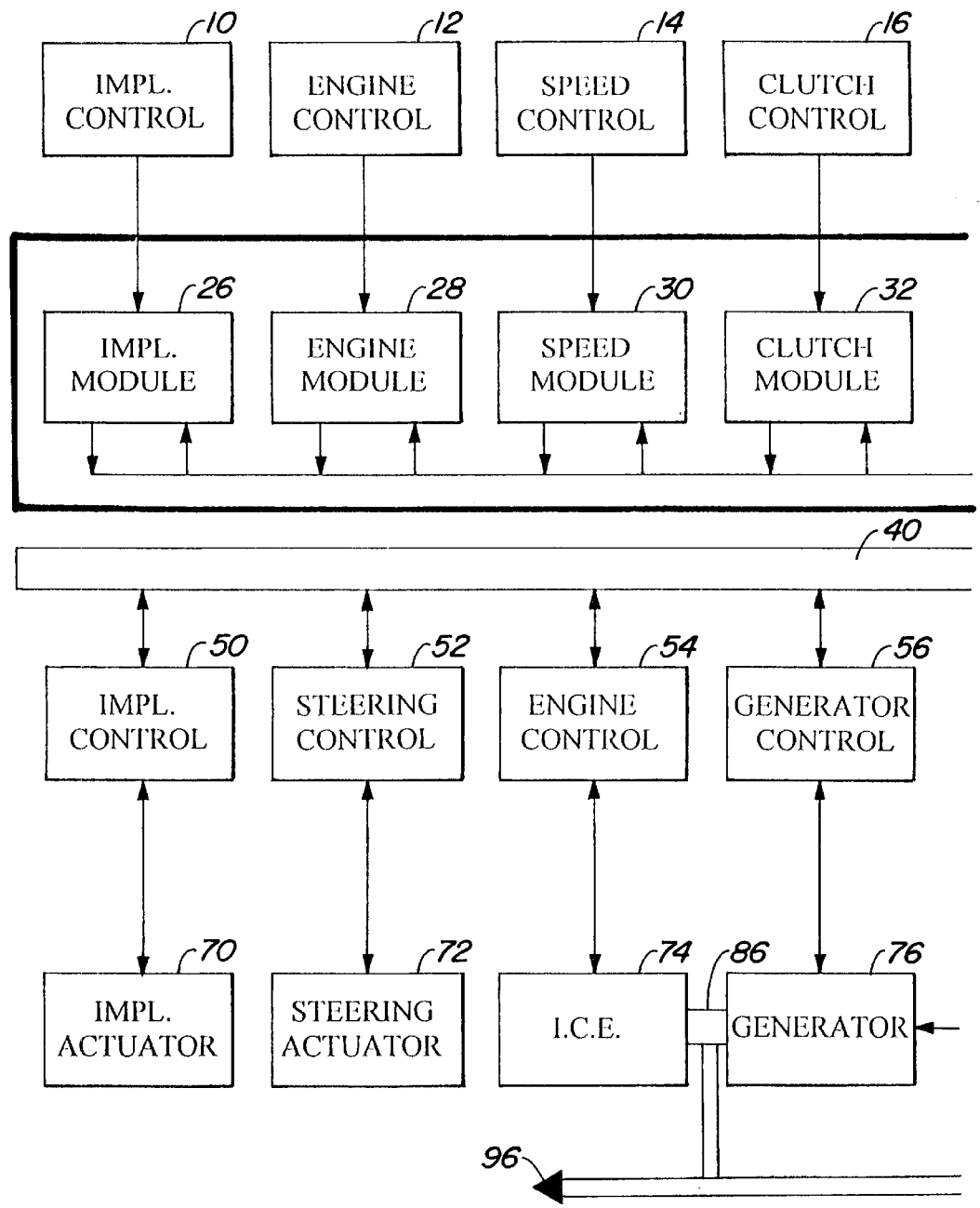
FIGS. 2a and 2b form a schematic block diagram of a drive system, for an electro-mechanically driven utility vehicle, according to the invention.
Figure 2B:
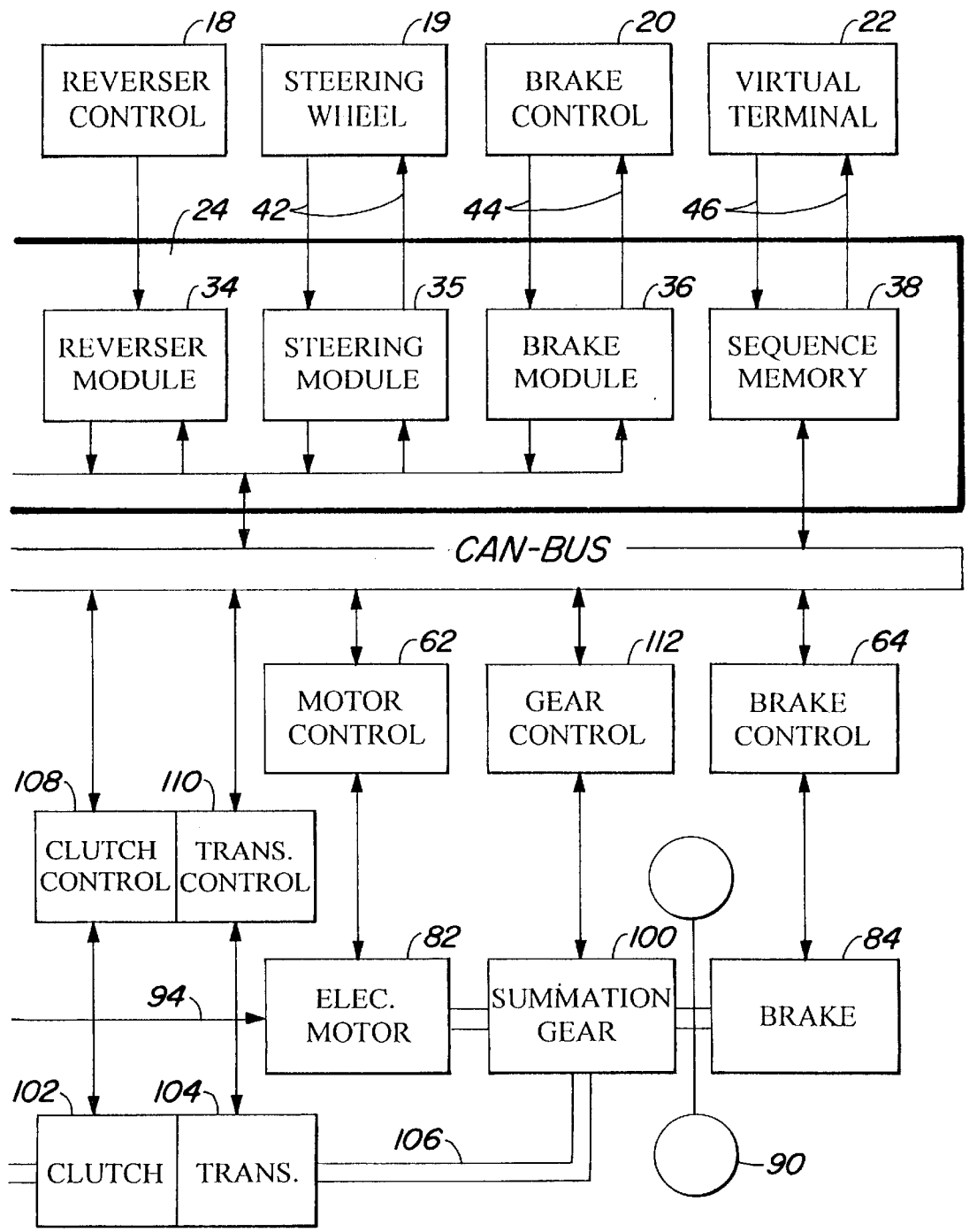

The drive system of FIG. 2 is similar to the drive system of FIG. 1 in many details. Therefore, similar components are assigned the same reference number. In contrast to FIG. 1, FIG. 2 shows only the right wheel 90, while the left wheel has been omitted for the sake of clarity. It should be understood that the left wheel, although not shown, is associated with the same drive and brake components as the right wheel 90. While FIG. 1 is based on a pure electric drive, FIG. 2 shows an electromechanical drive wherein each driven wheel 90 is supplied with power on the one hand by an electric motor 82 supplied by the generator 76 and on the other hand by a mechanical drive-line from the internal combustion engine 74. The electrical and the mechanical power is combined in a pick-off gearbox 100 and supplied to the wheel 90.

The mechanical drive-line includes the output shaft 86 of the engine 74, which drives a power take-off shaft 96 on the one hand and on the other hand is connected through a clutch 102, a gearbox 104 and a drive shaft 106 to the pick-off gearbox 100. The drive shaft 106 may be connected to pick-off gearboxes (not shown) of further electromechanically driven wheels.

The clutch 102 is controlled by a clutch controller 108 and the gearbox 104 is controlled by a gearbox controller 110. The clutch controller 108 and the gearbox controller 110 are connected over the system bus 40 with the process computer 24 and receive from it encoded target value. Furthermore, a pick-off gearbox controller 112 controls the pick-off gearbox 100 which can be shifted between various gear ratios and also receives over the system bus 40 coded information from the process computer 24.

The clutch controller 108 receives over the system bus 40 signals for disengaging and engaging the clutch 102. Furthermore, when the clutch is actuated the clutch function module 32 generates signals that are transmitted internally within the computer 24 to the engine function module 28 and, if necessary, to the gearbox function module 30 which perform a rotational speed synchronization of the input and output shafts of the clutch 102, so that the clutch 102 can again be engaged at any time smoothly without any shock.

The gearbox 104 may be a shifted gearbox that can be shifted between various gear ratios. The gearbox 104 may also contain a turning clutch, not shown in any greater detail. The gearbox controller 110 controls the shifting of the gearbox 104 and the turning clutch. The inputs for the gearbox controller 110 are made available, for example, by the reverse function module 34 and/or the gearbox function module 30 over the system bus 40.

Figure 3:
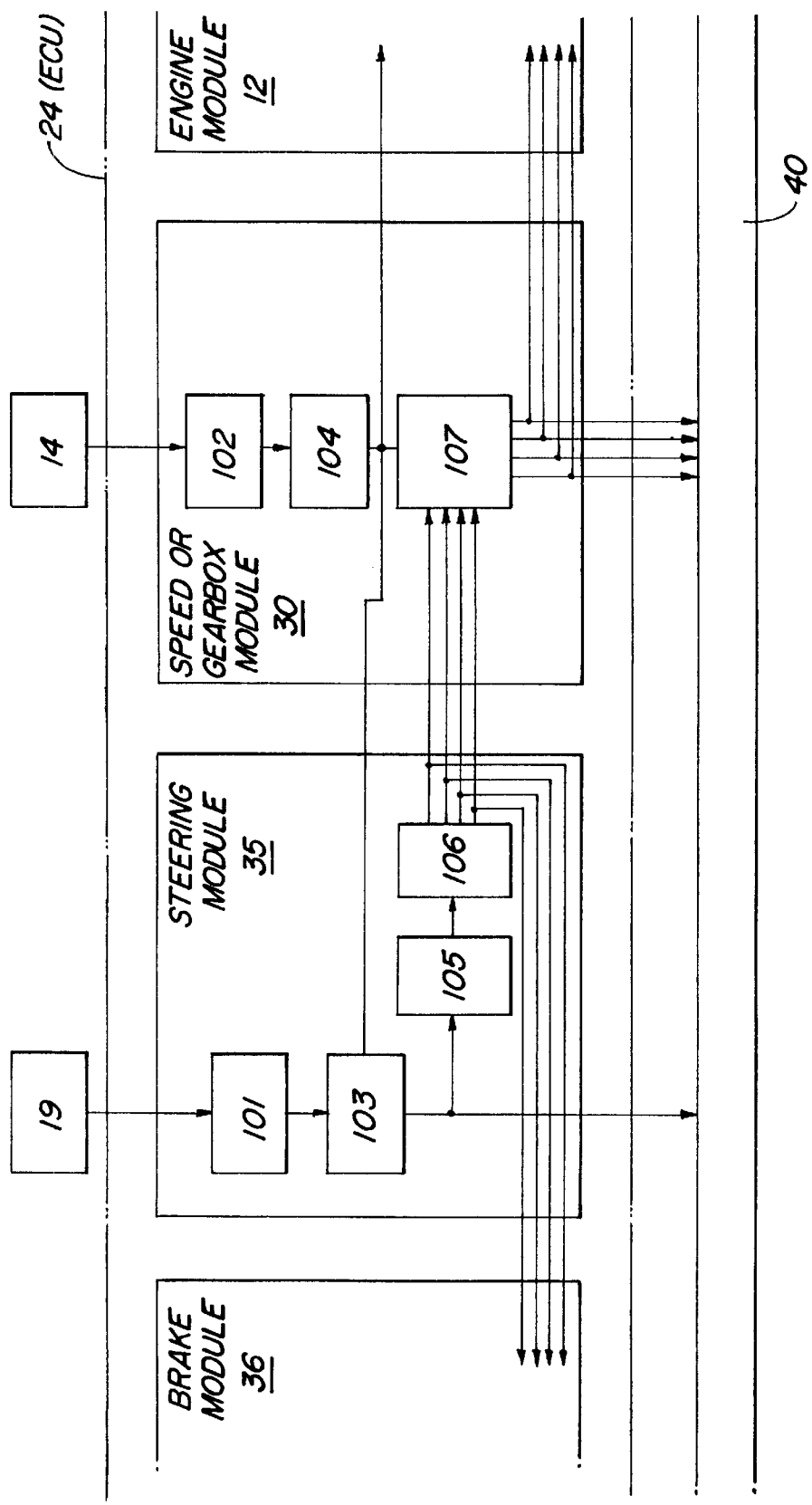
FIG. 3 is a more detailed schematic block diagram of a portion of a drive system according to the invention.

Referring to FIG. 3, there is shown a steering function module 35, a gearbox function module 30, an engine function module 12 and a brake function module 36, all of which are programs or subroutines which are run or executed internally within the computer 24. The steering function module 35 and the gearbox function module 30 receive signals from the steering control device 19 and the gearbox control device 14, respectively, and communicate signals to the bus 40. Preferably, the gearbox control device 14 is used to provide a desired vehicle speed signal. The steering function module 35 and the gearbox function module 30 each include, respectively, a signal receiving unit 101, 102 for receiving and normalizing received signals. The output of unit 101 is received by a classifying unit 103 which transmits an output signal to the bus 40. Preferably, unit 103 classifies the steering angle inputs with respect to actual vehicle speed according to predetermined limits, in order to determine steering angle target values for steering steerable wheels from a stored performance map and in terms of amount and direction. The classification parameters are preferably embodied in a stored performance map which is part of the steering function module. For example, if the vehicle speed exceeds a predetermined value, then the steering angle controller receives a steering angle target value input, and the steering controller commands a somewhat smaller steering angle than it would have done at lower speeds. The steering angel target values are transmitted over the bus 40 to the steering controllers.

With respect to the gearbox function module 30, the output signal of unit 102 is received by a modifying unit 104 which modifies speed input signals. Preferably, the gearbox function module 30 includes a stored speed performance map which can be programmed. Based on this store speed performance map, rotational speed values for the electric motors 80. 82 are modified in order to limit vehicle speed or for other purposes. The output of unit 104 is transmitted to the steering function module 35 and to the engine function module 12. Furthermore, the gearbox function module 30 transmits internally within the processor 24 correcting data to at least one further independently operating function module. Preferably, the gearbox function module transmits the next calculated target speed values internally within the processor 24 to the steering function module 35 and the engine function module 12.

Unit 105 of module 35 determines from the output signal of unit 103 the related Ackermann angle, and unit 106 calculates correction data for the speed of each wheel, such as explained in greater detail in the aforementioned U.S. Pat. No. 5,301,769. Preferably, the steering module therefore includes a steering performance map stored in memory. The steering function 35 module determines from the signals of the steering control device 19 the momentary relative steering angles (Ackermann angles) and establishes correction data (for example, rotational speed corrections) in conjunction with the stored steering performance map for each wheel with the goal of making possible at all steering angles a uniform stress-free drive and braking of the wheels.

The output signals of unit 106 of module 35 (for example, four values for four wheels) are transmitted to the gearbox function module 30 and to the brake function module 36. The correction data determined by the steering function module 35 are transmitted internally within the process computer 24 to at least one further function module, preferably to the gearbox function module 30 or the brake function module 36.

In the multiplying unit 107 of function module 30, the speed target values are multiplied by the output data from unit 106 in order to obtain speed target value inputs for the drives (motor controllers 60, 62) of each wheel. Preferably, these speed target values are corrected for each driven wheel depending upon the actual steering angle, in order to make possible a stress-free rolling of all wheels. For example, the map values determined by the steering function module 35 from the relative steering angle relationship for each wheel are multiplied by a desired speed target value in order to obtain speed target value inputs for the drives for the wheels.

The results of the gearbox function module 30 are made available for corrections in the engine function module 12. Thus, the calculation results of the gearbox module 30 are used not only for the control of the electric motor controllers. Rather, its results are made available internally within the computer 24 also for the correction of the results of the steering function module and/or the engine module 12, and, if available, further function modules.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A drive system for a utility vehicle, the drive system comprising:

a generator driven by an internal combustion engine;

at least one drive axle with wheels;

at least one steerable axle with wheels;

a plurality of actuator systems, including individual electric drive motors for driving the wheels of the drive axle and powered by the generator, and steering actuators for steering the wheels of the steerable axle;

a plurality of manually operable input control devices, including a steering input control device and a speed input control device;

a plurality of controllers, including steering controllers for controlling the steering actuators and motor controllers for controlling the electric drive motors;

a process computer having a plurality of parallel and substantially independently operating function modules which receive input signals from the input control devices and which generate control signals which are supplied to the plurality of controllers; and a system bus communicated with the process computer and with the plurality of controllers, the process computer generating a control message which is communicated over the bus simultaneously to all of the plurality of controllers, and the process computer generating other signals which are communicated between the function modules without being communicated over the bus.

2. The drive system of claim 1, wherein the process computer comprises:

a steering function module which processes steering signals related to the steering control device; and a brake function module operating parallel and independent of the steering function module, the brake function module processing brake signals related to a brake control device.

3. The drive system of claim 1, wherein:

the process computer comprises an parallel and independently operating steering function module which generates correction values derived from a steering angle map stored in memory, the correction values being communicated over the bus to a steering controller, and signals generated by the steering function module being communicated internally within the processor to at least one further independently operating function module associated with another of the plurality of controllers.

4. The drive system of claim 1, further comprising:

an automatic steering guidance system;

a stored steering sequence; and the process computer comprising an independently operating steering function module, the steering function module, selectively in response to an operator selection, processing signals associated with the steering control device, and processing signals associated with the automatic steering guidance system, or processing signals associated with the stored steering sequence.

5. The drive system of claim 1, further comprising:

a vehicle speed detector which generates actual speed signals; and the process computer comprises an independently operating steering function module which includes a stored performance map, the steering function module receiving signals from the steering control device and the steering function module receiving the actual speed signals from the vehicle speed detector, the steering function module generating steering set point values as a function of the performance map, the signals from the steering control device and the actual speed signals.

6. The drive system of claim 1, further comprising:

individual electric motor controllers associated with the individual electric motors;

a gearbox control device; and the process computer comprising an independently operating gearbox function module which processes lower importance signals associated with the gearbox control device, the process computer having a stored speed performance map, the gearbox function module generating rotational speed control signals for the individual electric drive motors and communicating said rotational speed signals over the system bus to said motor controllers and transmitting internally within the processor correction data to at least one further independently operating function module.

7. The drive system of claim 6, further comprising:

a vehicle speed detector which generates actual speed signals;

the gearbox control device setting a speed control signal; and the process computer including a steering function module, the process computer determining target speeds from the speed control signals and from the actual speed signals fed back over the system bus and calculating said target speeds with rotational speed factors which are associated with the individual wheels and which are determined by the correcting data depending on a steering angle of the steering function module, in order to determine the rotational speed target value inputs in terms of amount and direction for the individual electric drive motors, the process computer transmitting said rotational speed target value inputs in a message communicated via the system bus to the individual electric motor controllers.

8. The drive system of claim 7, further comprising:

an operator controlled speed input device for setting a maximum desired vehicle speed setpoint; and the gearbox function module receiving the speed setpoint and the actual speed signal, and the gearbox function module reducing the rotational speed target value inputs delivered over the system bus when the preset maximum desired vehicle speed is reached, in order to avoid exceeding the maximum desired vehicle speed.

9. The drive system of claim 1, further comprising:

an electric motor controller associated with each electric motor.

10. The drive system of claim 1, further comprising:

an internal combustion engine controller to control fuel injection for the engine; and the process computer comprises an independently operating internal combustion engine function module which supplies target value inputs to the internal combustion engine controller to control the fuel injected to the engine.

11. The drive system of claim 10, wherein:

the engine function module includes an stored engine performance map for the internal combustion engine and a stored generator performance map for the generator, the engine function module optimizing fuel injection target value inputs for fuel injection as a function of the performance maps, target speeds, and power requirements of the vehicle.

12. The drive system of the claims 10, further comprising:

a power take-off shaft driven by the engine; and a manually operable input control device, the engine function module being connected to the input control device, and engine function module communicating a target value to engine controller when the power take-off shaft is engaged.

13. The drive system of claim 12, characterized by:

an manually operable clutch control device;

a gearbox controller; and the process computer comprises an independently operating clutch function module which receives signals from the clutch control device, a gearbox function module, and a stored model of a coasting vehicle, the clutch function module transmitting signals internally within the process computer to the gearbox function module, and the gearbox function module transmitting target value inputs to the gearbox controller over the bus to control vehicle speed.

14. The drive system of claim 13, characterized by:

a mechanical drive line driven by the engine via a gearbox; and a summation gear associated with each drive wheel, the summation gear combining power from the drive line with that of the associated electric motor.

15. The drive system of claim 14, characterized by:

an operator actuatable clutch control device;

a clutch in the mechanical drive line; and a clutch controller, the clutch control device providing electrical signals to the clutch function module, the clutch function module transmitting signals to the clutch controller over the system bus upon an actuation of the clutch control device to disengage the clutch, the clutch function module also transmitting signals internally within the processor the gearbox controller to synchronize the clutch.

16. The drive system of claim 15, characterized by:

a manually operable reverse control device which generates reversing signals;

a turning clutch in the mechanical drive-line; and the process computer having an independently operating reverse function module which receives signals from the reverse control, the process computer having stored reversing operating sequences which can be recalled depending upon a position of the reverse control device, reverser process signals being transmitted internally within the process computer to other function modules and communicated over the system bus.

17. The drive system of claim 16, characterized by:

a turning clutch controller; and a control algorithm which operates to reduce the rotational speeds of the electric motors when the reverse function module generates a reverse signal, the control algorithm transmitting internally within the process computer calculation results to reduce the rotational speeds to the gearbox function module, and the reverse function module transmits a message over the system bus to the turning clutch controller to disengage the turning clutch when rotational speed drops below a defined value.

18. The drive system of claim 1, characterized by:

a manually operable brake control device which generates electrical brake signals;

a brake controller; and the process computer having an independently operating brake function module, the brake function module transmitting target value inputs over the system bus to the brake controller to control the brake controller when a preset brake signal is exceeded.

19. The drive system of claim 18, further comprising:

electric motor controllers for controlling the electric motors; and the process computer includes an independently operating gearbox function module, the brake function module evaluating a degree of retarding given as an input by the brake control device and transmitting internally within the process computer correcting data to the gearbox function module, the gearbox function module determining rotational speed values for the electric motors and transmitting said values over the system bus to the electric motor controllers.

20. The drive system according to claim 19, further comprising:

a vehicle speed detector which generates actual speed signals; and the brake function module, when a preset brake signal is exceeded, taking over control from the gearbox function module, calculating target rotational speed values from a desired speed preset by the brake control device and from the actual speed signals communicated over the system bus, and delivering the target rotational speed values over the system bus as inputs to the brake controller.

21. The drive system of claim 20, characterized by:

individual wheel brakes for braking the wheels; and the process computer including a steering function module which generates a steering angle signal, the process computer also including a stored performance map through which rotational speed factors are associated with the correction data depending on the steering angle signal, so that target speeds for the individual wheel brakes are corrected so as to conform to actual steering angles.

22. The drive system of claims 19, wherein:

the brake controller has priority control over wheel rotational speeds when a preset brake signal is exceeded.

23. The drive system of claim 18, further comprising:

a drive-line having a clutch;

a clutch controller for controlling the clutch; and the process computer having a clutch function module connected to the clutch controller via the bus, and when a preset brake signal is exceeded, the brake function module transmitting a clutch disengagement signal to the clutch function module, internally within the process computer clutch controller, and transmitting signals to the brake controller.

24. The drive system of claim 18, characterized by:

drive controllers for controlling the electric drive motors;

a drive-line having a clutch;

the process computer having a clutch function module and a gearbox function module, the brake function module, when a preset brake signal is exceeded, transmitting signals internally within the process computer to the clutch function module to disengage the clutch and causing the gearbox function module to transmit a message over the system bus to the drive controllers to synchronize the clutch.

25. The drive system of claim 18, characterized by:

the process computer having a gearbox function module, the gearbox function module storing a desired speed signal representing a speed of when the brake control device is deactivated.

26. The drive system of claim 1, further comprising:

a terminal connected to the process computer for the input and output of information.

27. The drive system of claim 1, wherein:

the process computer includes operating sequences stored in a sequence memory, the process computer activating an operating sequence and transmitting messages internally within the process computer to one or more of the function modules.

28. The drive system of claim 1, further comprising:

a primary vehicle battery; and a supplementary battery, the system bus comprising a bus having at least two independent, redundant bus cables, the supplementary battery providing power to the process computer and one of the bus cables upon failure of the primary vehicle battery.

29. The drive system of claim 1, wherein:

the process computer includes an independently operating implement function module which processes control signals from an operator input device, which processes stored sequence data, and which transmits output control signals over the system bus to an implement controller.

* * * * *